US012728916B2

(12) United States Patent
Goetz

(10) Patent No.: US 12,728,916 B2
(45) Date of Patent: Sep. 8, 2026

(54) DRIVING ASSISTANCE SYSTEM AND DRIVING ASSISTANCE METHOD FOR ASSISTING LATERAL GUIDANCE OF A VEHICLE

(71) Applicant: Bayerische Motoren Werke Aktiengesellschaft, Munich (DE)

(72) Inventor: Alexander Goetz, Munich (DE)

(73) Assignee: Bayerische Motoren Werke Aktiengesellschaft, Munich (DE)

( * ) Notice: Subject to any disclaimer, the term of this patent is extended or adjusted under 35 U.S.C. 154(b) by 85 days.

(21) Appl. No.: 18/285,874

(22) PCT Filed: Apr. 6, 2022

(86) PCT No.: PCT/EP2022/059152
§ 371 (c)(1),
(2) Date: Oct. 6, 2023

(87) PCT Pub. No.: WO2022/214560
PCT Pub. Date: Oct. 13, 2022

(65) Prior Publication Data

US 2024/0182109 A1 Jun. 6, 2024

(30) Foreign Application Priority Data

Apr. 7, 2021 (DE) ..................... 10 2021 108 684.1

(51) Int. Cl.
*B62D 6/08* (2006.01)

(52) U.S. Cl.
CPC ..................................... *B62D 6/08* (2013.01)

(58) Field of Classification Search
CPC ....... B62D 6/08; B62D 15/025; B62D 5/0463
(Continued)

(56) References Cited

U.S. PATENT DOCUMENTS 10,589,777 B2 3/2020 Hirate et al.
2015/0329140 A1 11/2015 Tamaizumi
(Continued)

FOREIGN PATENT DOCUMENTS

DE 10 2004 012 144 A1 9/2005
DE 10 2008 002 669 A1 1/2010
(Continued)

OTHER PUBLICATIONS

International Search Report (PCT/ISA/210) issued in PCT Application No. PCT/EP2022/059152 dated Sep. 9, 2022 with English translation (6 pages).

(Continued)

*Primary Examiner* — Scott A Reinbold
(74) *Attorney, Agent, or Firm* — Crowell & Moring LLP

(57) ABSTRACT

The present disclosure relates to a driving assistance system for assisting lateral guidance of a vehicle. The driving assistance system includes a steering assistance module configured to output a desired steering adjustment; a detection module configured to detect an actual steering adjustment; and a determination module configured to relate the desired steering adjustment and the actual steering adjustment to one another in order to determine a degree of difference between the desired steering adjustment and the actual steering adjustment. The steering assistance module is further configured to adjust a steering torque based on the degree of difference between the desired steering adjustment and the actual steering.

9 Claims, 3 Drawing Sheets

(58) Field of Classification Search
USPC ............................................................ 701/41
See application file for complete search history.

(56) References Cited

U.S. PATENT DOCUMENTS

| | | | | |
|---|---|---|---|---|
| 2018/0273087 | A1* | 9/2018 | Schiebahn ............. | B62D 1/286 |
| 2018/0319424 | A1* | 11/2018 | Giersiefer ................ | B62D 6/10 |
| 2022/0177026 | A1 | 6/2022 | Bergweiler et al. | |

FOREIGN PATENT DOCUMENTS

| | | | |
|---|---|---|---|
| DE | 10 2017 207 391 | A1 | 11/2018 |
| DE | 11 2017 001 278 | T5 | 2/2019 |
| DE | 10 2018 204 965 | B3 | 7/2019 |
| DE | 10 2018 127 306 | A1 | 4/2020 |
| DE | 10 2020 200 703 | B3 | 3/2021 |
| GB | 2549328 | A | 10/2017 |
| GB | 2569836 | A | 7/2019 |
| JP | 2012-232704 | A | 11/2012 |
| WO | WO 2020/216523 | A1 | 10/2020 |

OTHER PUBLICATIONS

German-language Written Opinion (PCT/ISA/237) issued in PCT Application No. PCT/EP2022/059152 dated Sep. 9, 2022 with English translation (9 pages).

German Search Report issued in German Application No. 10 2021 108 684.1 dated Nov. 2, 2021 with partial English translation (11 pages).

* cited by examiner

DRIVING ASSISTANCE SYSTEM AND DRIVING ASSISTANCE METHOD FOR ASSISTING LATERAL GUIDANCE OF A VEHICLE

BACKGROUND AND SUMMARY

The present subject matter relates to a driver assistance system for assisting lateral guidance of a vehicle, to a vehicle comprising such a driver assistance system, to a driving assistance method for assisting lateral guidance of a vehicle, and to a non-transitory computer-readable storage medium for carrying out the driving assistance method. The present disclosure relates in particular to adaptation of controller dynamics in the event of a driver taking over steering when the driving assistance system is active.

The development of driver assistance systems, for example for automated driving, is becoming ever more important. An example driver assistance system is the lane keeping assistant. The lane keeping assistant uses a camera to check lane markings and compares them with the position of the vehicle in the lane. If the vehicle risks unintentionally leaving the lane, the lane keeping assistant warns the driver by way of an optical, acoustic and/or haptic signal. However, if the driver activates the indicator, in order to change lane or make a turn, the lane keeping assistant does not intervene in the steering.

In addition to such warnings, active lane keeping assistants exist. The active lane keeping assistant also utilizes the camera image and compares it with the position of the particular vehicle. If the vehicle comes closer to the delimitation of the roadway than a minimum distance, the lane keeping assistant steers the vehicle back to the center of the lane again. Since the driver is also responsible in the case of activated lane keeping assistants, the lane keeping assistant continuously measures a manual torque of the driver against the steering wheel and checks whether the hands of the driver are still on the steering wheel. If this is not the case, the driver is warned to this effect and the lane keeping assistant is deactivated.

The manual torque of the driver is, however, suitable only to a limited extent for identifying driver interaction in the case of active lane keeping assistants, since both external disruptions (for example potholes, wind, etc.) and the lane keeping assistant itself act on the steering torque of the driver. Therefore, the lane keeping assistant may react to an assumed intervention by the driver even though in reality there is no driver intervention.

It is an object of the present disclosure to specify a driver assistance system for assisting lateral guidance of a vehicle, a vehicle comprising such a driver assistance system, a driving assistance method for assisting lateral guidance of a vehicle, and a non-transitory, computer-readable storage medium for carrying out the driving assistance method, which can improve interaction with a driver. In particular, an object of the present disclosure is to improve safety during the operation of a driver assistance system.

According to an independent aspect of the present disclosure, what is specified is a driver assistance system for assisting lateral guidance of a vehicle, in particular a motor vehicle. The driver assistance system may for example be a lane keeping assistant.

The driver assistance system comprises a steering assistance module, which is configured to output a setpoint steering setting; a detection module, which is configured to detect an actual steering setting; and a determination module, which is configured to correlate the setpoint steering setting and the actual steering setting with one another in order to ascertain a measure of a deviation between the setpoint steering setting and the actual steering setting, wherein the steering assistance module is also configured to set a steering torque on the basis of the measure of the deviation between the setpoint steering setting and the actual steering setting.

According to the present subject matter, the requested steering setting is evaluated in comparison with the real or actual steering setting. The steering torque applied by the driver assistance system is selected on the basis of the comparison, in particular according to a measure of the deviation between the requested steering setting and the actual steering setting.

For example, in the event of erroneous lane recognition, it may be the case that the driver assistance system steers in a more pronounced turn than is necessary. If the driver now steers in the opposite direction to keep the vehicle in the lane, the deviation between the steering setting requested by the driver assistance system and the actual steering setting brought about by the driver is great. The driver assistance system can identify this and reduce the controller dynamics, with the result that the driver does not have to work against the driver assistance system or the steering torque.

This makes it possible to enable an improved reaction to driver inputs. In addition, the influence of disruptions, such as potholes, can be minimized. Furthermore, the safety of the driver assistance system can be improved since the driver and the driver assistance system do not work against one another.

Preferably, the steering assistance module determines the steering torque on the basis of the measure of the deviation between the setpoint steering setting and the actual steering setting and outputs the determined steering torque to a steering system of the vehicle in order to assist the driver in the lateral guidance of the vehicle, for example in relation to a lane. The steering torque is what is referred to as an offsetting torque, which is introduced into the steering system of the vehicle or the corresponding actuator such that the vehicle is guided back into the lane. The at least one actuator may moreover be configured to provide an assistance torque, which assists the driver in applying a desired (manual) steering torque.

The steering torque is set for example in such a way that a strength of the steering torque is determined by the steering assistance module and output to the steering system of the vehicle as command or instruction. The expression "strength of the steering torque" refers to a size (or a magnitude or an intensity) of the force that corresponds to the steering torque and is provided for example by the at least one actuator of the steering system. The strength of the steering torque or of the offsetting torque in particular specifies how strongly the steering action is influenced by the driver assistance system. The strength of the steering torque or of the offsetting torque in particular specifies an intensity of the intervention made by the driver assistance system on the steering system or the steering wheel.

In this respect, the offsetting torque may be interpreted in absolute terms such that the vehicle is not kept in the lane against the driver's will and the driver is allowed to override the driver assistance system. For this, the driver applies a correspondingly great manual torque to the steering wheel such that a limit value is exceeded, this leading to deactivation of the driver assistance system.

Preferably, the driver assistance system comprises at least one detection unit, which is configured to detect at least one lane. On the basis of the detected data from the at least one detection unit, the driver assistance system assists the driver in the lateral guidance of the vehicle with respect to the at least one lane.

Preferably, the at least one detection unit comprises (or is) at least one camera, which is configured to detect the at least one lane. The at least one camera may for example be a CMOS camera mounted behind a windshield. The driver assistance system uses the detected images to identify lane markings and ascertain an optimum steering angle in order to keep the vehicle in the center of the lane. If the vehicle risks leaving the identified center of the lane, the offsetting torque is applied to the steering wheel.

Preferably, the setpoint steering setting is a setpoint steering angle or specifies a setpoint steering angle. Moreover, the actual steering setting may be an actual steering angle or specify an actual steering angle. The setpoint steering angle and the actual steering angle may relate for example to a front axle of the vehicle and specify a steering adjustment angle in relation to a neutral position, i.e. straight-ahead travel.

Preferably, the detection module is configured to detect the actual steering angle. For example, the detection module may comprise at least one sensor or be connected to at least one sensor which is configured to determine the steering angle on the front axle of the vehicle.

The present disclosure, however, is not limited to the steering angle and other means that specify a steering setting may be used. For example, the steering setting may be a setting of the steering wheel.

The setpoint steering setting, such as the setpoint steering angle, is a steering angle that is determined by the driver assistance system and requested by the steering system. The actual steering setting, such as the actual steering angle, is an actual or real steering angle set by the steering system. As a result of driver intervention or a manual torque applied to the steering wheel by the driver, the setpoint steering setting can deviate from the actual steering setting. In other words, the driver can intervene in the driver assistance system.

Within the context of the present disclosure, a situation is considered here in which the intervention by the driver is not yet pronounced enough for the driver assistance system to switch off. In other words, the examples of the present disclosure relate to an active driver assistance system.

Preferably, the determination module is also configured to take the measure of the deviation between the setpoint steering setting and the actual steering setting as a basis for identifying a steering situation. Here, the expression "steering situation" relates to the steering performed by the driver with respect to an action of the driver assistance system. The two variables "setpoint steering setting" and "actual steering setting" are therefore correlated such that a conclusion can be drawn as to what the driver is currently doing or what their steering intention is.

For example, the steering situation can be selected from the group comprising or consisting of concomitant steering by the driver, oversteering by the driver and the driver steering in the opposite direction. Concomitant steering may define slight steering in the same direction as the driver assistance system. Oversteering may define strong steering in the same direction as the driver assistance system, but with a larger steering angle as in the case of concomitant steering. Steering in the opposite direction may define steering against the driver assistance system.

Preferably, the determination module is also configured to identify concomitant steering by the driver when a magnitude of a difference between the setpoint steering setting and the actual steering setting is the same as or less than a first threshold. The first threshold may separate the steering situation "concomitant steering" from the steering situation "oversteering" or distinguish between them. In particular, the determination module may also be configured to identify oversteering by the driver when the magnitude of the difference between the setpoint steering setting and the actual steering setting is the same as or greater than the first threshold.

When concomitant steering by the driver is identified, the driver assistance system can perform control uninfluenced by driver intervention, i.e. there is no change in the steering torque brought about by the manual torque of the driver. The setting of the steering torque thus corresponds to the case without driver intervention.

Preferably, the determination module may be configured to identify oversteering by the driver when a difference between the setpoint steering setting and the actual steering setting is negative. In other words, oversteering by the driver is identified when the actual steering setting is greater than the setpoint steering setting, that is to say when the driver steers more strongly in the same direction as the driver assistance system.

Preferably, the determination module is configured to identify oversteering by the driver when the actual steering setting (or the measure of the deviation between the setpoint steering setting and the actual steering setting) is outside a first tolerance range around the setpoint steering setting. For example, a tolerance range of 20% around the setpoint steering setting can be defined. If the setpoint steering angle is 10°, the threshold for identifying oversteering is 12° (10°·0.2=2°). In the case of an actual steering setting of 11°, oversteering by the driver is therefore not determined, but it is in the case of an actual steering setting of 13°.

In some examples, oversteering by the driver can be determined when (i) the difference between the setpoint steering setting and the actual steering setting is negative, (ii) a magnitude of the difference between the setpoint steering setting and the actual steering setting is the same as or greater than the first threshold, and (iii) the actual steering setting is outside the first tolerance range around the setpoint steering setting.

In one example, the difference between the setpoint steering setting and the actual steering setting may be negative, and the actual steering setting may be outside the first tolerance range around the setpoint steering setting. If now the magnitude of the difference between the setpoint steering setting and the actual steering setting is also the same as or greater than the first threshold, oversteering can be determined. If the magnitude of the difference between the setpoint steering setting and the actual steering setting is less than the first threshold, however, concomitant steering can be determined.

The first threshold is intended to separate or distinguish concomitant steering from oversteering. The first tolerance range and the second tolerance range are intended to define from which deviation from the setpoint steering setting the controller dynamics will be reduced. If the deviation from the setpoint steering setting is within the tolerance range, the controller dynamics are not reduced.

The expression "controller dynamics", as used within the context of the present disclosure, describes a desired behavior of the control over time. High dynamics corresponds to a request for reaching the setpoint value quickly, or the use of high values for the manipulated variable (in this case, for example, thus a high steering torque). Low dynamics corresponds to a request for reaching the setpoint value slowly, or the use of low values for the manipulated variable (in this case, for example, thus a low steering torque).

The first threshold may for example be a fixed steering angle value, such as 2° or 5°. The first tolerance range may by contrast be defined as a percentage value for the setpoint steering setting, such as 10% or 20%.

Preferably, the determination module may also be configured to identify the driver steering in the opposite direction when a difference between the setpoint steering setting and the actual steering setting is positive. In other words, steering in the opposite direction by the driver is identified when the setpoint steering setting is greater than the actual steering setting, that is to say when the driver steers counter to the driver assistance system.

Preferably, the determination module may be configured to identify the driver steering in the opposite direction when the actual steering setting (or the measure of the deviation between the setpoint steering setting and the actual steering setting) is outside a second tolerance range around the setpoint steering setting. For example, a tolerance range of 20% around the setpoint steering setting can be defined. If the setpoint steering angle is 30°, the threshold for identifying steering in the opposite direction is 24° (30°·0.2=6°). In the case of an actual steering setting of 25°, the driver steering in the opposite direction is therefore not determined, but it is in the case of an actual steering setting of 23°.

In some examples, the driver steering in the opposite direction can be determined when (i) the difference between the setpoint steering setting and the actual steering setting is positive, and (ii) the actual steering setting is outside the second tolerance range around the setpoint steering setting.

The first tolerance range and the second tolerance range may in some examples be identical (for example 20%). In other examples, the first tolerance range and the second tolerance range may be different.

This should be understood as meaning that, for example, the steering angle can be suitably defined in order to satisfy the aforementioned relationships in accordance with their meaning or in order to correspondingly reproduce the steering situations. In particular, signs of the steering angle can be suitably selected for a position on the left and a position on the right and/or magnitudes of the setpoint steering angle and the actual steering angle can be used and/or a suitable angular scale between a position furthest to the left (for example +α) and a position furthest to the right (for example likewise +α, wherein 0° defines a neutral steering setting or straight-ahead travel) can be established.

Preferably, the steering assistance module is also configured to modify the steering torque only when oversteering or steering in the opposite direction is identified. When concomitant steering is identified, it can be interpreted as "no driver intervention" and the control dynamics are not modified.

Preferably, when oversteering is identified, a measure can be determined as to how strongly the driver is oversteering. The measure of the oversteering may for example be determined as a percentage value. For example, 0% specifies no oversteering. For example, in this instance the actual steering setting corresponds to the setpoint steering setting or is within the first tolerance range around the setpoint steering setting. By contrast, 100% specifies maximum oversteering. For example, in this instance the actual steering setting has deviated from the setpoint steering setting to the maximum extent. The maximum deviation may be defined as a value, for example. For example, maximum oversteering is reached upon a deviation of 10° between the actual steering angle and the setpoint steering angle.

Similarly, when steering in the opposite direction is identified, a measure can be determined as to how strongly the driver is steering in the opposite direction. The measure of the steering in the opposite direction may for example be determined as a percentage value. For example, 0% specifies no steering in the opposite direction. For example, in this instance the actual steering setting corresponds to the setpoint steering setting or is within the second tolerance range around the setpoint steering setting. By contrast, 100% specifies maximum steering in the opposite direction. For example, in this instance the actual steering setting has deviated from the setpoint steering setting to the maximum extent. The maximum deviation may be defined as a value, for example. For example, maximum steering in the opposite direction is reached upon a deviation of 10° between the actual steering angle and the setpoint steering angle.

Preferably, the steering assistance module is also configured to use the measure of the deviation between the setpoint steering setting and the actual steering setting as a basis for reducing the steering torque. In particular, the controller dynamics can be reduced in the event of a high deviation, so that the driver does not have to work against the driver assistance system or the applied steering torque. For example, the steering assistance module may be configured to set the steering torque smaller the greater the measure of the deviation between the setpoint steering setting and the actual steering setting is.

According to a further aspect of the present disclosure, a vehicle, in particular a motor vehicle, is specified. The vehicle comprises the driver assistance system for assisting lateral guidance of the vehicle according to the examples of the present disclosure.

The term "vehicle" covers automobiles, trucks, buses, motor caravans, motorcycles, etc. used for conveying people, goods, etc. The term in particular covers motor vehicles for conveying people.

According to a further aspect of the present disclosure, a driving assistance method for assisting lateral guidance of a vehicle, in particular a motor vehicle, is specified. The driving assistance method comprises outputting a setpoint steering setting; detecting an actual steering setting; determining a measure of a deviation between the setpoint steering setting and the actual steering setting; and setting a steering torque on the basis of the measure of the deviation between the setpoint steering setting and the actual steering setting.

The driving assistance method may implement the aspects of the driver assistance system described in this document.

According to another independent aspect of the present disclosure, a software (SW) program is specified. The SW program may be configured to be executed on one or more processors and as a result to carry out the driving assistance method described in this document for assisting lateral guidance of a vehicle.

According to another independent aspect of the present disclosure, a non-transitory, computer-readable storage medium is specified. The storage medium may comprise an SW program which is configured to be executed on one or more processors and as a result to carry out the driving assistance method described in this document for assisting lateral guidance of a vehicle.

According to another independent aspect of the present disclosure, the intention is to realize software with program code for carrying out the driving assistance method for assisting lateral guidance of a vehicle when the software is run on one or more software-controlled devices.

DETAILED DESCRIPTION OF THE DRAWINGS

In the following text, unless noted otherwise, the same reference signs are used for elements that are the same or have the same action.

Figure 1:
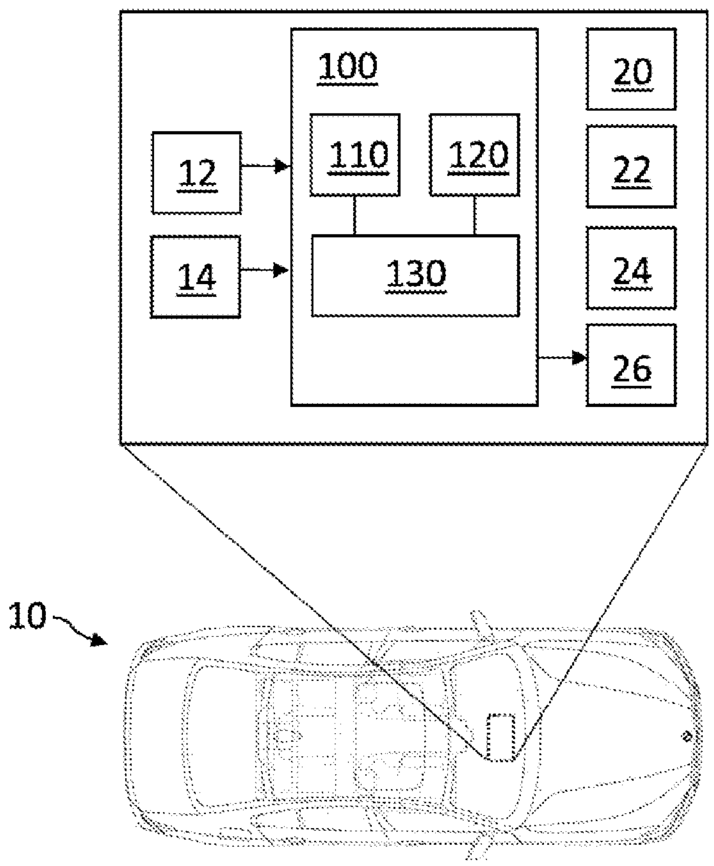
FIG. 1 schematically shows a vehicle comprising a driver assistance system for assisting lateral guidance of a vehicle according to examples of the present disclosure, FIG. 2 schematically shows concomitant steering, oversteering and steering in the opposite direction in relation to a setpoint steering setting according to examples of the present disclosure, FIG. 3 schematically shows oversteering in relation to a setpoint steering setting according to examples of the present disclosure, FIG. 4 schematically shows steering in the opposite direction in relation to a setpoint steering setting according to examples of the present disclosure.

FIG. 1 schematically shows a vehicle 10 comprising a driver assistance system 100 for assisting lateral guidance according to examples of the present disclosure. The driver assistance system 100 may for example be a lane keeping assistant.

The driver assistance system 100 assists the driver in the lateral guidance of the vehicle 10. To that end, the driver assistance system 100 controls the steering 26 via intermediate units, which are not illustrated. Optionally, the driver assistance system 100 can also be used for automatic longitudinal guidance of the vehicle 10. To that end, the driver assistance system 100 controls the drive 20, the gearbox 22 and the hydraulic service brake 24 via intermediate units, which are not illustrated.

To plan and carry out the lateral guidance, surroundings information from a surroundings sensor system, which observes the vehicle surroundings, is received by the driver assistance system 100. In particular, the vehicle may comprise at least one environmental sensor 12 which is configured to acquire environmental data indicating the vehicle surroundings. The at least one environmental sensor 12 may comprise, for example, one or more LiDAR systems, one or more radar systems and/or one or more cameras. In particular, the surroundings sensor system may be used for lane recognition.

The driver assistance system 100 comprises a steering assistance module 110, which is configured to output a setpoint steering setting; a detection module 120, which is configured to detect an actual steering setting; and a determination module 130, which is configured to correlate the setpoint steering setting and the actual steering setting with one another in order to ascertain a measure of a deviation between the setpoint steering setting and the actual steering setting, wherein the steering assistance module 110 is also configured to set a steering torque on the basis of the measure of the deviation between the setpoint steering setting and the actual steering setting.

In this way, the requested steering setting is evaluated in comparison with the real or actual steering setting. The steering torque applied by the driver assistance system 100 is selected on the basis of the comparison, in particular according to a measure of the deviation between the requested steering setting and the actual steering setting. For example, in the event of erroneous lane recognition, it may be the case that the driver assistance system 100 steers in a more pronounced turn than is necessary. If the driver now steers in the opposite direction to keep the vehicle 10 in the lane, the deviation between the steering setting requested by the driver assistance system 100 and the actual steering setting brought about by the driver is great. The driver assistance system 100 can identify this and reduce the controller dynamics, with the result that the driver does not have to work against the driver assistance system 100 or the applied steering torque.

Typically, the setpoint steering setting is a setpoint steering angle or specifies a setpoint steering angle. Moreover, the actual steering setting may be an actual steering angle or specify an actual steering angle. The setpoint steering angle and the actual steering angle may relate for example to a front axle of the vehicle 10 and specify a steering adjustment angle in relation to a neutral position, i.e. straight-ahead travel.

The measure of the deviation between the setpoint steering setting and the actual steering setting may, for example, be a difference between the setpoint steering angle and the actual steering angle.

The detection module 120 may be configured to detect the actual steering angle. For example, the detection module may be connected to at least one sensor 14 which is configured to determine the steering angle on the front axle of the vehicle.

The steering assistance module 110 and/or the detection module 120 and/or the determination module 130 may be implemented in a shared software and/or hardware module. As an alternative, the steering assistance module 110 and/or the detection module 120 and/or the determination module 130 may each be implemented in separate software and/or hardware modules.

Figure 2:
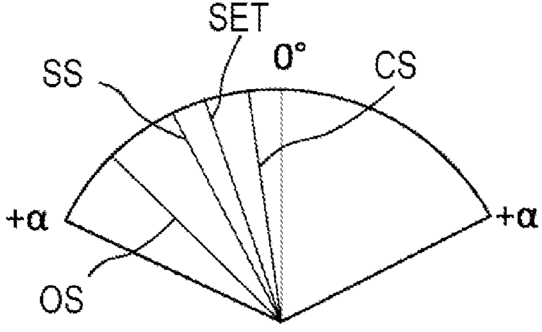

FIG. 2 schematically shows concomitant steering, oversteering and steering in the opposite direction in relation to a setpoint steering setting according to examples of the present disclosure.

FIG. 2 illustrates the steering setting by way of example as steering angle. The angular scale is defined between a position furthest to the left at $+\alpha$ and a position furthest to the right, likewise at $+\alpha$, where 0° defines a neutral steering setting or straight-ahead travel. The overall angular scale thus covers an angular range of $2\alpha$. The setpoint steering angle SET shown by way of example thus defines a left turn.

A first actual steering angle SS indicates a small deviation from the setpoint steering angle SET in the same steering direction (that is to say to the left). In the event of this small deviation, the first actual steering angle SS can be used as a basis to determine concomitant steering. In this case, it is possible for the controller dynamics not to be reduced. In other words, the steering torque can be set according to a case without driver intervention.

A second actual steering angle OS indicates a large deviation from the setpoint steering angle SET in the same steering direction (that is to say to the left). In the event of this large deviation, the second actual steering angle OS can be used as a basis to determine oversteering. In this case, the controller dynamics can be reduced, so that the driver does not have to work against the steering torque applied by the driver assistance system.

A third actual steering angle CS indicates a deviation from the setpoint steering angle SET counter to the steering direction (that is to say to the right). In the event of this deviation, the third actual steering angle CS can be used as a basis to determine steering in the opposite direction. In this case, the controller dynamics can likewise be reduced, so that the driver does not have to work against the steering torque applied by the driver assistance system.

Figure 3:
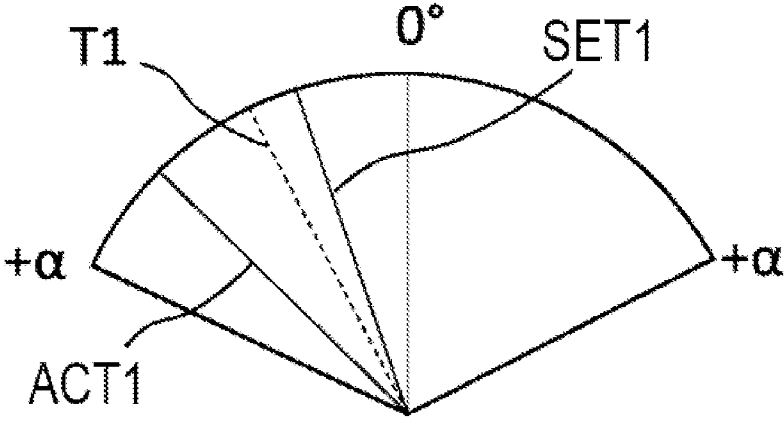

FIG. 3 schematically shows oversteering in relation to a setpoint steering setting according to examples of the present disclosure.

The driver assistance system may be configured to identify oversteering by the driver when the actual steering setting ACT1 is outside a first tolerance range T1 around the setpoint steering setting SET1. For example, a tolerance range of 20% around the setpoint steering setting SET1 can be defined. If the setpoint steering angle SET1 is 10°, the threshold for identifying oversteering can be 12° (10°·0.2=2°). In the case of an actual steering setting of 11°, oversteering by the driver is therefore not determined, but it is in the case of an actual steering setting of 13°.

Figure 4:
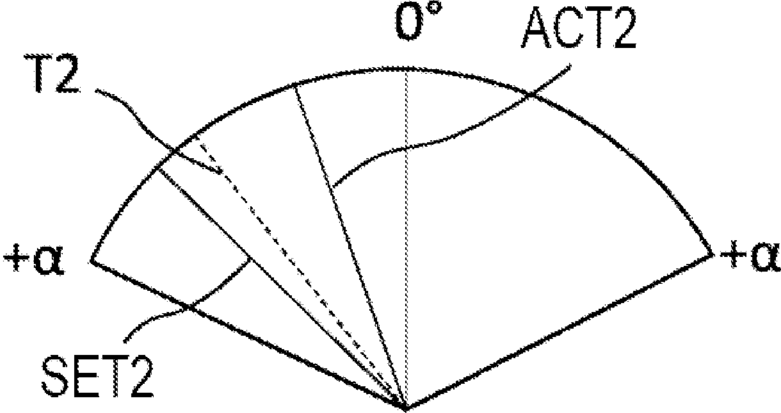

FIG. 4 schematically shows steering in the opposite direction in relation to a setpoint steering setting according to examples of the present disclosure.

The driver assistance system may be configured to identify the driver steering in the opposite direction when the actual steering setting ACT2 is outside a second tolerance range T2 around the setpoint steering setting SET2. For example, a tolerance range of 20% around the setpoint steering setting SET2 may be defined. If the setpoint steering angle is 30°, the threshold for identifying steering in the opposite direction can be 24° (30°·0.2=6°). In the case of an actual steering setting of 25°, the driver steering in the opposite direction is therefore not determined, but it is in the case of an actual steering setting of 23°.

In one example, a driver with an active lane keeping assistant is making a turn. Erroneous interpretation of the lane markings by the camera causes the lane keeping assistant to steer excessively (for example with a steering angle of 30°) and the driver actively steers against it (for example 10° degrees) in order to prevent them leaving the actual lane. In this situation, the controller dynamics are reduced in order to not unnecessarily hinder the driver in correcting the movement of the vehicle.

The difference ascertained in the present case between the two steering angles is 30°−10°=20°. Assuming a 20% tolerance zone in relation to the setpoint steering angle, the limit for steering in the opposite direction is 24° (0.2·30°=6°). Since the steering angle of 10° is smaller than the ascertained limit of 24°, steering in the opposite direction is occurring.

In order to be able to determine a relative degree of steering in the opposite direction, the set steering angle of 10° can be correlated with the limit of 24° and a percentage value can be ascertained. This value can be forwarded to the controller function, with the result that the controller dynamics are correspondingly reduced by the ascertained percentage.

Figure 5:
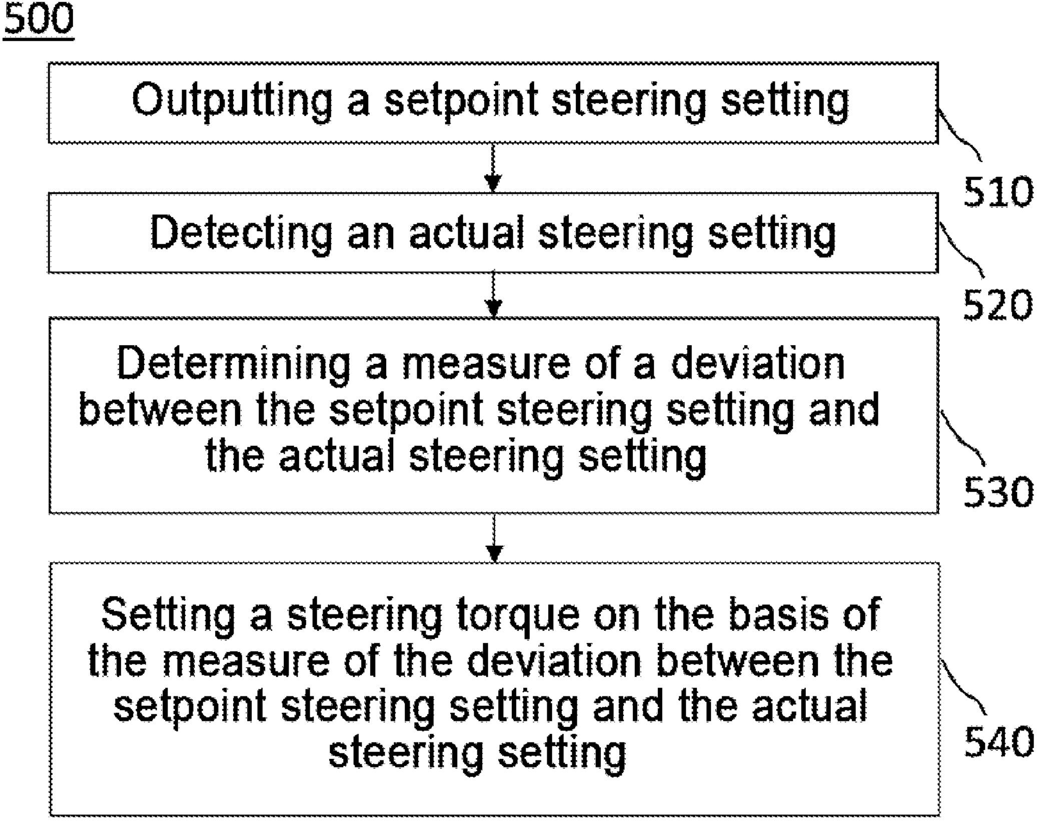
FIG. 5 shows a flow diagram of a driving assistance method for assisting lateral guidance of a vehicle according to examples of the present disclosure.

FIG. 5 schematically shows a flow diagram of a driving assistance method 500 for assisting lateral guidance of a vehicle according to examples of the present disclosure. The driving assistance method 500 may be implemented by corresponding software which can be executed by one or more processors (for example a CPU).

The driving assistance method 500 comprises, in block 510, outputting a setpoint steering setting; in block 520, detecting an actual steering setting; in block 530, determining a measure of a deviation between the setpoint steering setting and the actual steering setting; and, in block 540, setting a steering torque on the basis of the measure of the deviation between the setpoint steering setting and the actual steering setting.

According to the present subject matter, the requested steering setting is evaluated in comparison with the real or actual steering setting. The steering torque applied by the driver assistance system is selected on the basis of the comparison, in particular according to a measure of the deviation between the requested steering setting and the actual steering setting. This makes it possible to enable an improved reaction to driver inputs. In addition, the influence of disruptions, such as potholes, can be minimized. Furthermore, the safety of the driver assistance system can be improved since the driver and the driver assistance system do not work against one another.

The term module (and other similar terms such as unit, subunit, submodule, etc.) in the present disclosure may refer to a software module, a hardware module, or a combination thereof. Modules implemented by software are stored in memory or non-transitory computer-readable medium. The software modules, which include computer instructions or computer code, stored in the memory or medium can run on a processor or circuitry (e.g., ASIC, PLA, DSP, FPGA, or other integrated circuit) capable of executing computer instructions or computer code. A hardware module may be implemented using one or more processors or circuitry. A processor or circuitry can be used to implement one or more hardware modules. Each module can be part of an overall module that includes the functionalities of the module. Modules can be combined, integrated, separated, and/or duplicated to support various applications. Also, a function being performed at a particular module can be performed at one or more other modules and/or by one or more other devices instead of or in addition to the function performed at the particular module. Further, modules can be implemented across multiple devices and/or other components local or remote to one another. Additionally, modules can be moved from one device and added to another device, and/or can be included in both devices and stored in memory or non-transitory computer readable medium.

Although the present subject matter has been explained and illustrated in more detail by preferred examples, the present subject matter is not restricted by the disclosed examples and other variations can be derived therefrom by those skilled in the art without departing from the scope of protection of the present subject matter. It is therefore clear that there is a multiplicity of possible variations. It is likewise clear that examples mentioned by way of example effectively only constitute examples which should not be construed in any way as limiting for instance the scope of protection, the possible applications or the configuration of the present subject matter. On the contrary, the above description and the description of the figures give those skilled in the art the ability to implement the examples in specific terms, wherein those skilled in the art with knowledge of the disclosed concept of the present subject matter may make numerous modifications, for example with regard to the function or the arrangement of the individual elements mentioned in an example, without departing from the scope of protection defined by the claims and their legal counterparts, such as for instance further explanations in the description.

The invention claimed is:

1. A driver assistance system for assisting lateral guidance of a vehicle, comprising:

a detection module configured to detect an actual steering setting applied manually to a steering wheel of the vehicle;

a determination module configured to:

determine an amount of deviation between a setpoint steering setting and the actual steering setting, and identify a steering situation based on the determined amount of deviation between the setpoint steering setting and the actual steering setting, wherein the steering situation is identified from the group consisting of: a concomitant steering situation, an oversteering situation, and an opposing steering situation; and a steering assistance module configured to:

output the setpoint steering setting according to which the steering assistance module autonomously steers the vehicle via applying a steering torque to the steering wheel of the vehicle, and set the steering torque applied to the steering wheel of the vehicle during the autonomous steering based on the amount of deviation between the setpoint steering setting and the actual steering setting.

2. The driver assistance system of claim 1, wherein the setpoint steering setting specifies or is a setpoint steering angle, and wherein the actual steering setting specifies or is an actual steering angle.

3. The driver assistance system of claim 1, wherein the concomitant steering situation is identified in response to determining that the difference between the setpoint steering setting and the actual steering setting is the same as or less than a first threshold, wherein the oversteering situation is identified in response to determining that the difference between the setpoint steering setting and the actual steering setting is negative, and wherein the opposing steering situation is identified in response to determining that the difference between the setpoint steering setting and the actual steering setting is positive.

4. The driver assistance system of claim 1, wherein the steering assistance module is further configured to:

modify the steering torque in response to identifying the oversteering situation and in response to identifying opposing steering, and not modify the steering torque in response to identifying concomitant steering situation.

5. The driver assistance system of claim 1, wherein the steering torque is reduced based on the amount of deviation between the setpoint steering setting and the actual steering setting.

6. The driver assistance system of claim 5, wherein the steering torque is progressively reduced as the amount of deviation between the setpoint steering setting and the actual steering setting increases.

7. A motor vehicle comprising:

a steering wheel; and a driver assistance system for assisting lateral guidance of the motor vehicle, the driver assistance system comprising:

a detection module configured to detect an actual steering setting applied manually to the steering wheel;

a determination module configured to:

determine an amount of deviation between a setpoint steering setting and the actual steering setting, and identify a steering situation based on the determined amount of deviation between the setpoint steering setting and the actual steering setting, wherein the steering situation is identified from the group consisting of: a concomitant steering situation, an oversteering situation, and an opposing steering situation; and a steering assistance module configured to:

output the setpoint steering setting according to which the steering assistance module autonomously steers the vehicle via applying a steering torque to the steering wheel of the vehicle, and set the steering torque applied to the steering wheel of the vehicle during the autonomous steering based on the amount of deviation between the setpoint steering setting and the actual steering setting.

8. A driving assistance method for assisting lateral guidance of a vehicle, comprising:

outputting, via a steering assistance module, a setpoint steering setting according to which the steering assistance module autonomously steers the vehicle via applying a steering torque to a steering wheel of the vehicle;

detecting, via a detection module, an actual steering setting applied manually to the steering wheel;

determining, via a determination module, an amount of deviation between the setpoint steering setting and the actual steering setting;

identifying, via the determination module, a steering situation based on the determined amount of deviation between the setpoint steering setting and the actual steering setting, wherein the steering situation is identified from the group consisting of: a concomitant steering situation, an oversteering situation, and an opposing steering situation; and setting, via the steering assistance module, a steering torque applied to the steering wheel of the vehicle during the autonomous steering based on the amount of deviation between the setpoint steering setting and the actual steering setting.

9. A non-transitory computer-readable storage medium storing instructions configured to be executed on one or more processors to carry out a driving assistance method for assisting lateral guidance of a vehicle, comprising:

outputting, via a steering assistance module, a setpoint steering setting according to which the steering assistance module autonomously steers the vehicle via applying a steering torque to a steering wheel of the vehicle;

detecting, via a detection module, an actual steering setting applied manually to the steering wheel;

determining, via a determination module, an amount of deviation between the setpoint steering setting and the actual steering setting;

identifying, via the determination module, a steering situation based on the determined amount of deviation between the setpoint steering setting and the actual steering setting, wherein the steering situation is identified from the group consisting of: a concomitant steering situation, an oversteering situation, and an opposing steering situation; and setting, via the steering assistance module, a steering torque applied to the steering wheel of the vehicle during the autonomous steering based on the amount of deviation between the setpoint steering setting and the actual steering setting.

* * * * *